United States Patent

[11] 3,622,634

[72] Inventor Pierre Legendre
De Fonval, France
[21] Appl. No. 748,230
[22] Filed July 29, 1968
[45] Patented Nov. 23, 1971
[73] Assignee Societe Nationale des Petroles D'Aquitaine
Courbevoie, France
[32] Priority Aug. 1, 1967
[33] France
[31] 116438

[54] HALOGENATED ALKENYL SULFIDES
5 Claims, No Drawings
[52] U.S. Cl. .................................................. 260/609 A,
260/609 E, 260/654 R

[51] Int. Cl. ................................................ C07c 149/10,
C07c 149/34
[50] Field of Search ........................................ 260/609 A

[56] References Cited
OTHER REFERENCES
Nesmegamov et al. " Acad. Sci. USSR, Div. of Chem. Sci."
(1954) pp. 205– 208

Primary Examiner—Charles B. Parker
Assistant Examiner—D. R. Phillips
Attorney—Ostrolenk, Faber, Gerb & Soffen CLAIM: Bis (haloalkenyl) sulfides are prepared by the reaction of a stoichiometric excess of alkaline earth or alkali metal sulfide with an alkenyl halide.

HALOGENATED ALKENYL SULFIDES

RELATED APPLICATIONS

This application is based on French application PV 116 4 38 filed Aug. 1, 1967.

DESCRIPTION OF THE PRIOR ART

The conventional process of preparing bis(haloalkene) sulfides consists in causing an alkali metal sulfide to react with a polyhaloalkene:

$$2R_1R_2C=CR_3-CHR_4X+Na_2S \rightarrow (R_1R_2C=CR_3-CH_2)_2S+2NaX \quad (1)$$

wherein $R_1$, $R_2$, $R_3$ and $R_4$ are hydrogen, halogen, alkyl or aryl, X being a halogen, usually chlorine or bromine.

This reaction is generally carried out with a stoichiometric proportion of the reactants, that is to say, 1 mole of alkali sulfide to 2 moles of haloalkene. Excess alkali sulfide is avoided, especially when the alkene to be treated contains more than one halogen atom (X), for fear that the second (or other remaining) of these atoms will also react.

The known process does not give good results in all cases: even if it leads to a yield of about 80 percent in the preparation, say of $(CH_2=CCl-CH_2)_2S$, it does not permit the easy or economically feasible preparation of certain sulfides. For example heretofore it has not been possible to prepare bis(trihalo-alkenyl)- and bis(tetrahalo-alkenyl) sulfides.

SUMMARY OF THE INVENTION

The present invention results from the unexpected discovery that while an excess of alkali metal sulfide does not in practice eliminate more than one halogen atom of a tri-, tetra- or pentahaloalkene, it in fact facilitates the elimination of only the one halogen that which was on the carbon atom in the three-position, that is to say, in the β-position with respect to the double bond, in order to give the corresponding sulfide in a very acceptable yield.

In the process of the present invention a mono and polyhaloalkene is reacted with an alkali or alkaline earth metal sulfide in an alcoholic or hydroalcoholic medium at a temperature of between say 15° and 100° C. It is a critical feature of the invention that the molar ratio of the metal sulfide to the haloalkene be at least 1.2:2.

The sulfides of haloalkenyls have different applications, particularly in the preparation of polyhaloalkenes. Thus it is important to be able to obtain such sulfides in an economical manner. The novel polyhaloalkene sulfides of this invention are useful as intermediates for the preparation of polyhaloalkenes, as disclosed in applicant's copending application SN 658347 filed Aug. 4, 1967, now U.S. Pat. No. 3,497,565 granted Feb. 24, 1970, which, in turn, are useful as starting materials for the preparation of solvents, flame-retardant chemicals, polymerization regulators, lubricant additives, plasticizers and polymeric materials.

PREFERRED EMBODIMENTS

In the preferred embodiments of the present invention one reactant is a haloalkene of the general formula:

$$R_1R_2C=CR_3-CHR_4X$$

wherein $R_1$, $R_2$, $R_3$ and $R_4$ may be hydrogen, alkyl, suitably alkyl having one to six carbon atoms, such as ethyl, propyl, butyl, isobutyl and the like, aryl, such as phenyl, aralkyl such as benzyl or phenethyl, and halo, suitably chloro or bromo and at least one member of the group $R_1$, $R_2$, $R_3$, and $R_4$ is halo; and X is halo such as chloro or bromo.

The second reactant is an alkali or alkaline earth metal sulfide such as lithium, sodium, potassium, magnesium or calcium sulfide. The reaction is carried out in an alcoholic medium. Most suitable are lower alkanols such as ethanol, methanol, propanol, butanol or the like. The alcohols may be mixed. If desired water may also be added. Especially suitable are mixtures of methanol and/or ethanol with approximately 5 to 50 percent of water and may contain 5 to 60 percent by weight of haloalkene and preferably 10 to 40 percent of such a compound. The preferred proportions of reactants 1.2 to 3 moles of alkali or alkaline earth sulfide preferably 1.6 to 2.6 moles of metallic sulfide for every 2 moles of haloalkene.

In another embodiment of the invention polyhaloalkanes may be used as starting materials. In this modification the reaction may be carried out in the presence of the appropriate amount of base, suitably an alkali such as sodium hydroxide, potassium hydroxide or calcium hydroxide.

According to one embodiment of the invention, the bis-(haloalkenyl) sulfide which is formed is extracted from the reaction medium by means of an appropriate solvent, particularly ether, chloroform or the like.

The novel chemical compounds which form the subject of the present invention are the sulfides of bis- (di- and trihalopropenes) of formula:

$$(R_1-CX=CX \cdot CH_2)_2S$$

In particular compounds where $R_1$ is hydrogen or X. The products most readily obtainable in practice being those of which the halogen X is chlorine.

The invention is illustrated by the following nonlimiting examples.

EXAMPLE 1

A solution of 22.2 g. of 1,3-dichloropropene (0.2 mole) and 24 g. of $Na_2S \cdot 20$ (0.1 mole) in 100 ml. of aqueous methanol (methanol:water = 9:1) is heated to 60° C. under reflux for 30 minutes. After cooling, an extraction with ether is carried out, and this yields 14.9 g. of sulfide $(CHCl=CH \cdot CH_2)_2S$ of which the boiling point is 64° C./0.4 mm. Hg. The yield from the reaction is 80 percent.

EXAMPLE 2

In accordance with the procedure of example 1, but using 48 g. (0.2 mole), of sodium sulfide, [i.e.: 2 moles of metal sulfide: 2 moles of dichloropropene, there is obtained 16.8 g. of $(CHCl=CH-CH_2)_2S$ (90 percent yield).

EXAMPLES 3 to 5

The procedure of example 1 was repeated with the three chlorinated compounds indicated below, with from 2 to 2.55 moles of sodium sulfide for 2 moles of chloroalkene. The following table indicates the formulas and the quantities of chloroalkene used and of the sulfides obtained; it also gives the quantities of $Na_2S \cdot 20$ which are used and the yields which are achieved.

| Examples | 3 | 4 | 5 |
|---|---|---|---|
| Starting product | $CH_2=CCl-CH_2Cl$ | $CHCl=CCl-CH_2Cl$ | $CCl_2=CCl-CH_2Cl$ |
| Its weight in g | 111 | 90 | 300 |
| In moles | 1.0 | 0.62 | 1.66 |
| $Na_2S \cdot 9H_2O$, g | 240 | 180 | 400 |
| In moles | 1 | 0.79 | 1.66 |
| Moles of $Na_2S$ for 2 moles of chloroalkene | 2 | 2.55 | 2 |
| Sulphide obtained | $(CH_2=CCl-CH_2)_2S$ | $(CHCl=CCl-CH_2)_2S$ New | $(CCl_2=CCl-CH_2)_2S$ New |
| Its weight in g | 85 | 32 | 130 |
| Yield with respect to the chloroalkene being used, percent | 93 | 42 | 5 |

It is to be noted that the operations according to examples 4 and 5 lead to poor yield if 1 mole of $Na_2S \cdot 9H_2O$ is used for 2 moles of chloroalkene, in accordance with the stoichiometry of reaction (1).

The sulfides which are prepared in examples 4 and 5 are new compounds, of which no mention has been found in the literature. Their respective characteristics are:

|  | Bis-(1,2-dichloropropene) sulfide $(CHCl=CCl-CH_2)_2S$ | Bis-(1,1,2-trichloropropene) sulfide $(CCl_2=CCl-CH_2)_2S$ |
|---|---|---|
| Boiling point at 1 mm. Hg | 114° C. | 125° C. |
| Infra-red spectrum (cm. $^{-1}$) | 3,080 | 2,990 |
|  | 2,920 | 2,920 |
|  |  | 2,890 |
|  | 1,610 | 1,600 |
|  | 1,410 | 1,410 |
|  | 1,280 | 1,240 |
|  | 1,230 |  |
|  | 1,180 | 1,190 |
|  | 1,090 | 1,120 |
|  | 1,040 |  |
|  | 930 | 940 |
|  | 870 | 900 |
|  | 810 | 860 |
|  | 630 |  |

I claim:

1. In a process for the preparation of a bis-(haloalkenyl) sulfide by reacting an alkali metal or alkaline earth metal sulfide with a haloalkene of the formula $$R_1R_2C=CR_3-CHR_4X,$$

wherein $R_1$, $R_2$, $R_3$ and $R_4$ are hydrogen, $C_1$ to $C_6$ alkyl, phenyl, benzyl, phenethyl, chloro or bromo and at least one member of $R_1$, $R_2$, $R_3$ and $R_4$ is chloro or bromo, and X is chloro or bromo, in a lower alkanolic or hydrous-lower alkanolic reaction medium at temperatures of from 15° to 100° C., the improvement which comprises reacting such materials in the proportion of from 1.2 to 3 moles of the alkali or alkaline earth metal sulfide per each 2 moles of the haloalkene reactant.

2. The process of claim 1, in which the haloalkene has the formula $$R_5R_6C=CR_7-CH_2X$$

wherein $R_5$, $R_6$ and $R_7$ are hydrogen, chloro or bromo and at least one of $R_5$, $R_6$ and $R_7$ is chloro or bromo.

3. The process of claim 1, wherein the haloalkene is a di-, tri-, or tetrachloropropene in which at least one of the chloro atoms is in the three-position.

4. The process of claim 1, wherein the haloalkene reactant is 1,3-dichloropropene, 2,3-dichloropropene, 1,2,3-trichloropropene, or 1,1,2,3-tetrachloropropene.

5. The process of claim 1, wherein the alkali metal or alkaline earth metal sulfide and haloalkene are reacted in the proportion of from 1.6 to 2.6 moles of the former per each 2 moles of the latter.

* * * * *